United States Patent

Raghavan et al.

[11] Patent Number: 5,997,429
[45] Date of Patent: Dec. 7, 1999

[54] FIVE SPEED PLANETARY TRANSMISSION

[75] Inventors: Sekhar Raghavan; Kumaraswamy V. Hebbale; Patrick Benedict Usoro, all of Troy, Mich.

[73] Assignee: General Motors Corporation, Detroit, Mich.

[21] Appl. No.: 09/166,237

[22] Filed: Oct. 5, 1998

[51] Int. Cl.$^6$ ........................................... F16H 3/44
[52] U.S. Cl. ................ 475/280; 475/284; 475/286; 475/311
[58] Field of Search ................... 475/280, 311, 475/284, 219, 269, 286

[56] References Cited

U.S. PATENT DOCUMENTS

| | | | |
|---|---|---|---|
| 2,748,622 | 6/1956 | Syrovy et al. | 475/284 |
| 3,318,174 | 5/1967 | Clapp et al. | 475/269 |
| 4,089,239 | 5/1978 | Murakami et al. | 475/280 |
| 4,483,215 | 11/1984 | Ishimaru et al. | 475/280 |
| 4,976,670 | 12/1990 | Klemen | 475/280 |
| 5,141,477 | 8/1992 | Oshidari | 475/330 |
| 5,567,201 | 10/1996 | Ross | 475/280 |
| 5,692,988 | 12/1997 | Beim et al. | 475/281 |

FOREIGN PATENT DOCUMENTS

| | | | |
|---|---|---|---|
| 99971 | 6/1977 | Japan | 475/280 |
| 118244 | 5/1990 | Japan | 475/280 |
| 129447 | 5/1990 | Japan | 475/280 |
| 19450 | 1/1992 | Japan | 475/280 |

*Primary Examiner*—Richard M. Lorence
*Assistant Examiner*—Ha Ho
*Attorney, Agent, or Firm*—George A. Grove

[57] ABSTRACT

A planetary transmission has two planetary gear sets, one of which is a simple planetary gear set. The ring gear of the simple planetary gear set is continuously connected with a transmission output shaft. Six fluid-operated friction torque transmitting devices are operable in combinations of three to establish a reverse drive and five forward drive ratios in the two gear sets. The gear sets are continuously interconnected by at least one drive member and are selectively interconnected by one of the torque transmitting devices. Two of the three devices engaged for reverse and first are also engaged in neutral.

13 Claims, 3 Drawing Sheets

FIVE SPEED PLANETARY TRANSMISSION

TECHNICAL FIELD

This invention relates to planetary gear transmissions and more particularly to such transmissions employing two planetary gear sets.

BACKGROUND OF THE INVENTION

Automatic transmissions employ multi-speed planetary gear sets, controlled by friction clutches and brakes, to provide a plurality of gear ratios between the engine and final drive gearing. The number of ratios provided in passenger vehicles has increased from two forward ratios and one reverse ratio to five forward ratios and one reverse ratio. As the number of ratios increases, the number of planetary gear sets has increased.

Currently the five speed transmissions available in passenger vehicles incorporate three planetary gear sets. It has been proposed in the art to use only two gear sets. Such devices are disclosed in pending U.S. Ser. Nos. 09/144,140 filed Aug. 31, 1998 and 09/179,756 filed Oct. 27, 1998 and in U.S. Pat. No. 5,879,264, which are assigned to the assignee of this application. Five speed arrangements incorporating two gear sets are also shown in U.S. Pat. Nos. 5,141,477; 5,567,201 and 5,692,988.

SUMMARY OF THE INVENTION

It is an object of the present invention to provide an improved five speed planetary transmission having two planetary gear sets and six selectively engageable friction devices.

In one aspect of the present invention, one of said planetary gear sets is a simple planetary gear set with the ring gear thereof continuously connected with an output shaft of the transmission. In another aspect of the present invention, the other two members of the simple planetary gear set are connectable with a stationary member of the transmission.

In yet another aspect of the present invention, the second planetary gear set has the carrier assembly thereof connectable with the output member of the transmission. In still another aspect of the present invention, the sun gear member and carrier assembly members are selectively connectable with a transmission input shaft via respective selectively engageable clutches.

In a further aspect of the present invention, the second planetary gear set is a simple planetary gear set. In a yet further aspect of the invention, the second planetary gear set is a compound planetary gear set.

DESCRIPTION OF EXEMPLARY EMBODIMENTS

Figure 1:
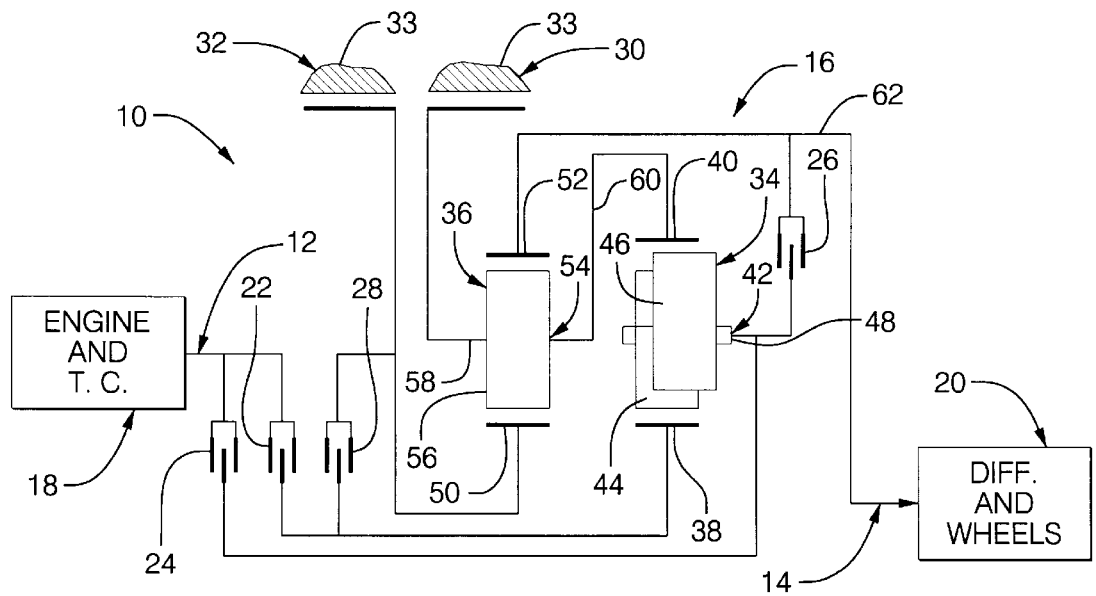
FIG. 1 is a schematic diagram of a planetary gear arrangement incorporating one embodiment of the present invention.

A transmission 10 has an input shaft 12, an output shaft 14 and a planetary gear arrangement 16. The input shaft 12 is drivingly connected with a conventional engine and torque converter 18, and the output shaft 14 is drivingly connected with a conventional differential 20. The engine and torque converter are conventional well known devices; the torque converter includes a conventional torque converter clutch. The engine and torque converter 18, the transmission 10 and the differential 20 comprise a vehicle powertrain. The differential 20 is connected in a conventional manner with the vehicle drive wheels, not shown.

The planetary gear arrangement 16 is controlled by four selectively engageable friction clutches 22, 24, 26, and 28 and two selectively engageable friction brakes 30 and 32 to provide five forward drive ratios, a reverse ratio and a neutral condition between the engine and the drive wheels. The clutches 22, 24, 26, 28 and the brakes 30, 32 are conventional fluid-operated frictional engaging torque transmitting devices which are constructed in a well-known manner. The brakes 30, 32 have one component thereof connected with a transmission housing 33.

The planetary gear arrangement 16 includes two planetary gear sets 34 and 36. The planetary gear set 34 has a sun gear member 38, a ring gear member 40 and a planet carrier assembly member 42. The planet carrier assembly member has a plurality of meshing pinion gears 44, 46 rotatably mounted on a carrier housing or spider 48 in a conventional manner. The pinion gear 44 meshes with the sun gear member 38, and the pinion gear 46 meshes with the ring gear member 40. The pinion gears 44, 46 are disposed in three or four pairs on the spider 48 to evenly distribute the torque transmitted therebetween.

The planetary gear set 36 is a simple planetary set having a sun gear member 50, a ring gear member 52 and a planet carrier assembly member 54. The planet carrier assembly member 54 has a plurality of pinion gears 56 (only one of which is shown) rotatably mounted on a housing or spider 58 and are disposed in meshing relation with both the sun gear member 50 and the ring gear member 52.

The ring gear member 40 and the planet carrier assembly member 54 are drivingly connected through a hub 60 that is also connectable with brake 30. The ring gear member 52 is continuously drivingly connected with the output shaft 14 through a hub 62. The sun gear member 38 is selectively drivingly connected with the input shaft 12 through the clutch 22. The planet carrier assembly member 42 is selectively drivingly connected with the input shaft 12 through the clutch 24. The sun gear member 50 is connected with the brake 32 and through the clutch 28 with the sun gear member 38. The planet carrier assembly member 42 is selectively drivingly connected with the output shaft 14 through the clutch 26.

In the neutral condition, the clutch 28 and brake 30 can be engaged without causing any torque transmission through the planetary gear arrangement 16. This permits a change from neutral to reverse gear or drive ratio with only the engagement of the clutch 22, and a change from neutral to the first forward gear or drive ratio with only the engagement of the clutch 24. Those familiar with the transmission arts will recognize the benefit of this arrangement. A reverse to forward transition can occur with only the disengagement of clutch 22 and the engagement of clutch 24. This will, of course, simplify the control function of the transmission.

The reverse ratio relies on the planetary gear set 36 since the planet carrier assembly member 58 is stationary and the sun gear member 50 is driven by the input shaft 12 while the ring gear member 52 drives the output shaft. In the first forward gear ratio, both planetary gear set 34 and planetary gear set 36 are utilized.

The second forward gear or drive ratio is established by engaging brake 32 and simultaneously disengaging brake 30. The clutches 24 and 28 remain engaged. Hence, a single transition shift occurs. This establishes sun gear member 50 and sun gear member 38 as reaction members in the planetary gear arrangement 16. Both planetary gear set 34 and planetary gear set 36 are active in producing the second drive ratio.

The third drive ratio is established by the disengagement of brake 32 and the simultaneous engagement of the clutch 22. The third forward ratio is a direct ratio such that the output shaft 14 and the input shaft 12 rotate at the same speed. The interchange from the second forward ratio to the third forward ratio is a single transition shift.

The fourth forward drive ratio is established by simultaneously disengaging clutch 28 and engaging brake 32. The sun gear member 50 is a reaction member, and the planetary gear set 34 is maintained in a direct drive condition. The ring gear member 40 and, therefore, planet carrier assembly member 54 rotate at the speed of input shaft 12. The planetary gear set 36 is in an overdrive condition such that the output shaft 14 rotates faster than the input shaft 12. The third to fourth ratio interchange is a single transition shift.

The fifth forward drive ratio is established by the interchange of clutch 24 and clutch 26. The sun gear member 38 is the input member and the sun gear member 50 is the reaction member. The planet carrier assembly member 42 is connected with the ring gear member 52 and output shaft 14. This results in forward rotation of the ring gear member 40 and faster rotation of the ring gear member 52. This is an overdrive condition that uses the ratios of both planetary gear set 34 and planetary gear set 36.

The clutch 28 and brake 30 are engaged during the reverse ratio, neutral condition and the first and lowest forward ratio. The clutch 28 is also engaged for two other forward ratios. The clutch 22 is engaged during three forward ratios and the reverse ratio. The clutch 24 is engaged during four forward ratios and the brake 32 is engaged during three forward ratios. The clutch 26 is the only friction member that is engaged during just one ratio.

| | | |
|---|---|---|
| Gear Set 34 Ring/Sun Ratio | 1.65 | 1.65 |
| Gear Set 36 Ring/Sun Ratio | 2.00 | 2.25 |
| First Gear Ratio | 3.08 | 3.46 |
| Second Gear | 1.69 | 1.76 |
| Third Gear | 1.00 | 1.00 |
| Fourth Gear | 0.67 | 0.69 |
| Fifth Gear | 0.45 | 0.49 |
| Reverse Gear | 2.00 | 2.25 |
| First - Second Step Size | 1.82 | 1.97 |
| Second - Third | 1.69 | 1.76 |
| Third - Fourth | 1.50 | 1.44 |
| Fourth - Fifth | 1.48 | 1.41 |

The above chart describes the gear ratio values and step size between ratios for the gearing shown in FIG. 1 for two ring gears to sun gear ratios. Except for the third ratio (direct drive), all of the ratios are affected by a change in the planetary gear set 36.

Figure 2:
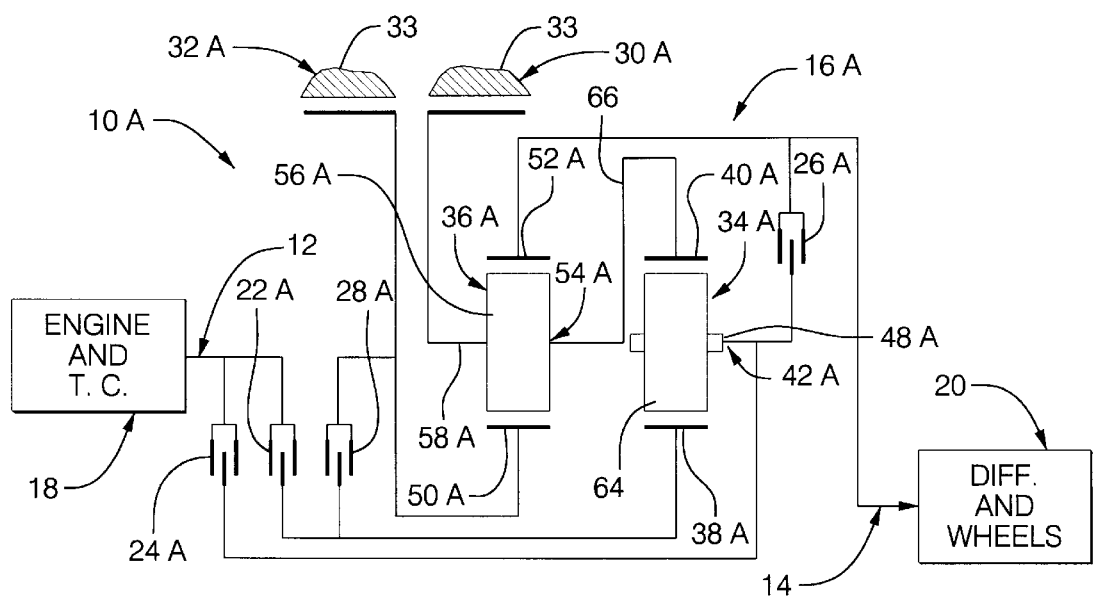
FIG. 2 is a schematic diagram of a planetary gear arrangement incorporating another embodiment of the present invention.

The powertrain shown in FIG. 2 has a planetary transmission 10A disposed between the engine and torque converter 18 and the differential 14. The transmission 10A includes a planetary gear arrangement 16A having a pair of simple planetary gear sets 34A and 36A, a plurality of selectively engageable clutches 22A, 24A, 26A and 28A and a plurality of selectively engageable brakes 30A and 32A. The planetary gear set 34A has a sun gear member 38A, a ring gear member 40A and a planet carrier assembly member 42A. The planet carrier assembly member 42A has a housing or spider 48A rotatably mounting a plurality of pinion gears 64 disposed in meshing arrangement with the sun gear member 38A and the ring gear member 40A.

The planetary gear set 36A has a sun gear member 50A, a ring gear member 52A and a planet carrier assembly member 54A. The planet carrier assembly member 54A has a plurality of pinion gears 56A rotatably mounted on a housing or spider 58A. The pinion gears 56A are disposed in meshing relation with the sun gear member 50A and the ring gear member 52A.

The sun gear member 38A is selectively connectable with the input shaft 12 through the clutch 22A and with the sun gear member 50A through the clutch 28A. The ring gear member 40A is continuously drivingly connected with planet carrier assembly member 54A through a hub 66. Both planet carrier assembly member 54A and ring gear member 40A are connected with the brake 30 A. The planet carrier assembly member 42 A is drivingly connectable with the input shaft 12 through the clutch 24A and to the ring gear member 52A through the clutch 26A. The sun gear member 50A is selectively connected with the transmission housing 33 through the brake 32A.

The transmission 10A will provide five forward drive ratios, a reverse ratio and a neutral condition between the engine 18 and the differential 20 through the selective engagement of the clutches 22A, 24A, 26A, and 28A and the brakes 30A and 32A in a manner similar to the transmission 10 shown in FIG. 1. During the reverse drive ratio, neutral condition and the first forward ratio, the clutch 22A and brake 30A are engaged. With only these two devices engaged, the planetary gear assembly 16A is not conditioned to transmit torque. To complete the reverse drive ratio, the clutch 28A is engaged, thereby connecting the sun gear member 38A with the sun gear member 50A. The reverse drive is dependent only on the planetary gear set 36A. The first forward ratio is completed with the engagement of the clutch 26A. This connects the planet carrier assembly member 42A with the output shaft 14. The first forward drive ratio is dependent only on the gears in the planetary gear set 34A.

The second forward ratio is established by the interchange of the brakes 30A and 32A. The sun gear member 50A becomes the reaction member and the ring gear member 52A and planet carrier assembly member 42A are both connected to the output shaft 14. Planetary gear set 34A and planetary gear set 36A contribute to the second forward ratio.

The third forward drive ratio is established with the interchange of the clutches 24A and 22A. With both clutches 24A and 26A engaged, the input shaft 12 is connected directly with the output shaft 14. The brake 32A, while engaged, is ineffective during this ratio.

The fourth forward drive ratio is established by the interchange of clutches 22A and 26A. The clutches 24A and 22A establish a direct drive in the planetary gear set 34A such that the planet carrier assembly member 54A is driven at input speed. With the sun gear member 50A held stationary, the ring gear member 52A is driven at an overdrive ratio. This ratio depends only on the gear elements in the planetary gear set 36A.

The fifth and highest forward drive ratio is established by the interchange of the clutches 28A and 22A. Both sun gear member 38A and sun gear member 50A are reaction members in the planetary gear arrangement 16A. The ring gear member 40A of the planetary gear set 34A is rotated at an overdrive ratio such that the input rotation to the planet carrier assembly member 54A is at a speed greater than input speed. This results in the ring gear member 40A being driven at an overdrive ratio that has a faster output speed, for a given input speed, during the fifth forward drive ratio than during the fourth forward drive ratio.

The clutch 22A is engaged during the reverse ratio, the neutral condition, the first forward drive ratio and two other forward drive ratios. The brake 30A is engaged during the reverse drive ratio, the neutral condition and the first forward drive ratio. The clutch 24A is engaged during the three highest forward drive ratios. The clutch 26A is engaged during the three lowest forward drive ratios. The clutch 28A is engaged during the reverse drive ratio and the highest forward drive ratio. The brake 32A is engaged during the four highest forward drive ratios. All of the clutches and brakes of the transmission 10A are engaged during at least two operating conditions.

| Gear Set 34A Ring/Sun Ratio | 2.20 | 2.00 |
|---|---|---|
| Gear Set 36A Ring/Sun Ratio | 2.00 | 2.00 |
| First Gear Ratio | 3.20 | 3.00 |
| Second Gear | 1.73 | 1.67 |
| Third Gear | 1.00 | 1.00 |
| Fourth Gear | 0.67 | 0.67 |
| Fifth Gear | 0.46 | 0.44 |
| Reverse Gear | 2.00 | 2.00 |
| First - Second Step Size | 1.84 | 1.80 |
| Second -- Third | 1.73 | 1.67 |
| Third -- Fourth | 1.50 | 1.50 |
| Fourth -- Fifth | 1.45 | 1.50 |

The above chart describes the gear ratio values and step size between ratios for the gearing shown in FIG. 2 for two ring gear to sun gear ratios. The fourth forward and reverse drives are the same since the simple planetary gear set 36A is unchanged. These two ratios depend only on the simple planetary gear set 36A.

Figure 3:
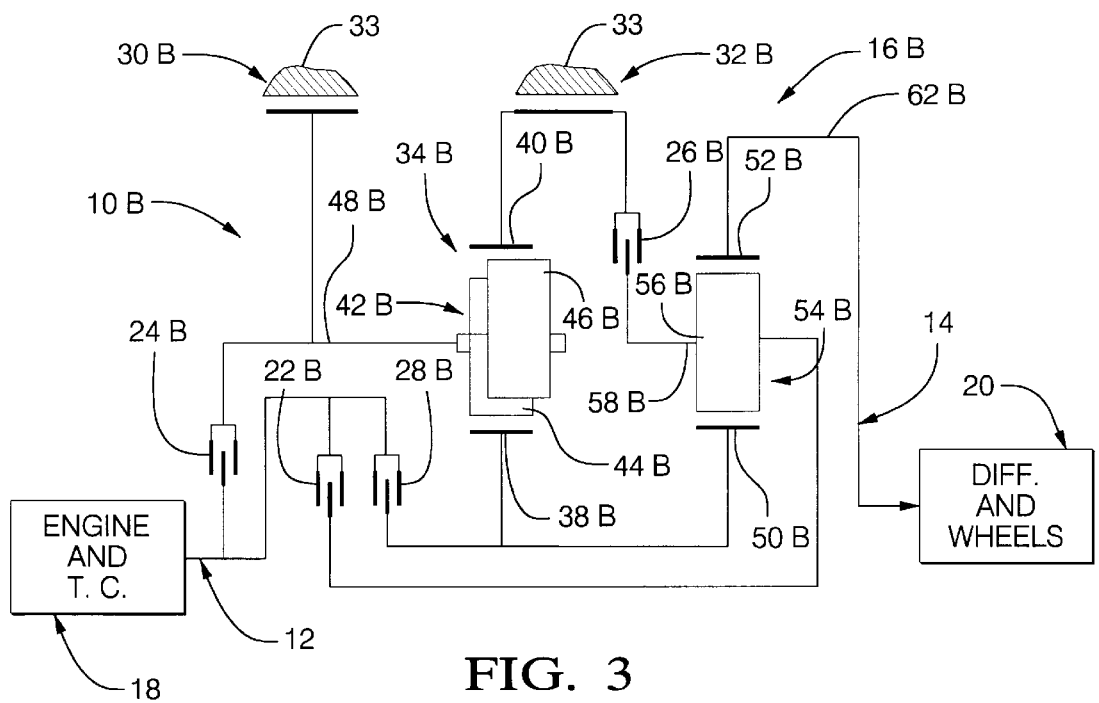
FIG. 3 is a schematic diagram of a planetary gear arrangement incorporating yet another embodiment of the present invention.

The powertrain, shown in FIG. 3, has an engine and torque converter 18, an input shaft 12, a planetary transmission 10B, an output shaft 14 and a differential 20. The transmission 10B has a planetary gear arrangement 16 B, four selectively engageable clutches 22B, 24B, 26B and 28B, and two selectively engageable brakes 30B and 32B. The planetary gear arrangement 16B has a compound planetary gear set 34B and a simple planetary gear set 36B.

The planetary gear set 34B has a sun gear member 38 B, a ring gear member 40B and a planet carrier assembly 42B which includes a spider pinion 44B meshes with the sun gear member 38B, and the pinion 46B meshes with the ring gear member 40 B. The planetary gear set 36B includes a sun gear member 50B, a ring gear member 52B and a planet carrier assembly member 54B having a plurality of pinion gear members 56B rotatably mounted on a spider 58B. The pinion gear members 56B are in meshing relation with the sun gear member 50B and the ring gear member 52B.

The planet carrier assembly member 42B is drivingly connected with the clutch 24B and the brake 30B. The sun gear member 38B is continuously drivingly connected with the sun gear member 50B and also with the clutch 28B. The ring gear member 40B is connected with the brake 32B and with the clutch 26B. The planet carrier assembly member 54B is drivingly connected with the clutches 22B and 26B. The ring gear member 52B is continuously drivingly connected with the output shaft 14. The clutches 24B, 28B and 22B are selectively connectable with the input shaft 12 for transmitting torque to the respective gear members connected therewith.

The clutches 22B, 24B, 26B and 28B and the brakes 30B and 32B are selectively engaged in combinations to establish five forward drive ratios, a neutral condition and a reverse drive ratio. The clutches 28B and 26B are engaged in the reverse drive ratio, the neutral condition and the first and lowest forward drive ratio. To complete the reverse drive ratio and launch the vehicle, the brake 32B is engaged. To complete the first drive ratio and launch the vehicle, the brake 30B is engaged. Thus, the vehicle drive condition is changed between forward and reverse by swapping only two torque transmitting devices, namely the brakes 30B and 32B. In the reverse drive ratio, the planet carrier assembly member 54B is the reaction member and the gear ratio is provided by the planetary gear set 36B. In the first forward drive ratio, the reaction member is planet carrier assembly member 42B, and the gear ratio is provided by the planetary gear set 34B and the planetary gear set 36B. In both the reverse drive ratio and the first forward drive ratio, the output shaft 14 rotates slower that the input shaft 12.

To establish the second forward ratio, the clutch 28B is disengaged and the clutch 22B is simultaneously engaged. The planet carrier assembly member 42B remains as the reaction member and the planet carrier assembly member 54B is the input member. The gear ratio is provided by the planetary gear set 34B and the planetary gear set 36B.

To establish the third forward speed ratio, the clutch 26B is disengaged and the clutch 28B is engaged. The brake 30B remains engaged but is ineffective. The planetary gear set 36B is in a direct drive condition so that the output shaft 14 rotates at the same speed as the input shaft 12.

To establish the fourth forward drive ratio, the clutch 28B and the brake 32B are interchanged. The planet carrier assembly member 42B and the ring gear member 40B are both held stationary such that the planetary gear set 34B and sun gear member 50B are stationary. The planetary gear set 36B provides an overdrive ratio between the output shaft 14 and the input shaft 12.

To establish the fifth and highest forward speed ratio, the brake 30B and the clutch 24B are interchanged. The ring gear member 40B is the reaction member, and the planet carrier assembly member 56B and the planet carrier assembly member 42B are driven by the input shaft. The sun gear member 50B rotates opposite to the input shaft 12, thereby adding to the forward rotation of the planet carrier assembly member 54B resulting in an overdrive ratio that causes a higher output shaft speed for a given input shaft speed when compared with the fourth forward ratio.

The clutch 24B is only engaged during the fifth forward ratio. The clutch 28B is engaged during four transmission conditions, including reverse, neutral, first and third. The clutch 22B is engaged for the four highest of the forward ratios, and the clutch 26B is engaged during reverse, neutral and the two lowest forward ratios. The brake 30B is engaged during the four lowest forward drive ratios, and the brake 32B is engaged during reverse and the two highest forward ratios.

During the normal ratio change progression, all of the upshifts and downshifts are single transition interchanges. An interchange between second and fourth is also a single transition process as is the interchange between first and third. The benefits of single transition shifts or interchanges is well known. The electrohydraulic controls are less complicated when the interchange uses a one to one swap of the friction devices.

| Gear Set 34B Ring/Sun Ratio | 1.87 | 1.77 |
|---|---|---|
| Gear Set 36B Ring/Sun Ratio | 2.50 | 1.82 |
| First Gear Ratio | 2.87 | 3.07 |
| Second Gear | 1.53 | 1.73 |
| Third Gear | 1.00 | 1.00 |
| Fourth Gear | 0.71 | 0.65 |
| Fifth Gear | 0.57 | 0.51 |
| Reverse Gear | 2.50 | 1.82 |
| First - Second Step Size | 1.87 | 1.77 |
| Second -- Third | 1.53 | 1.73 |
| Third -- Fourth | 1.40 | 1.55 |
| Fourth -- Fifth | 1.25 | 1.27 |

The above chart describes the gear ratio values and step size between ratios for the gearing shown in FIG. 3 for two ring gear to sun gear ratios.

Figure 4:
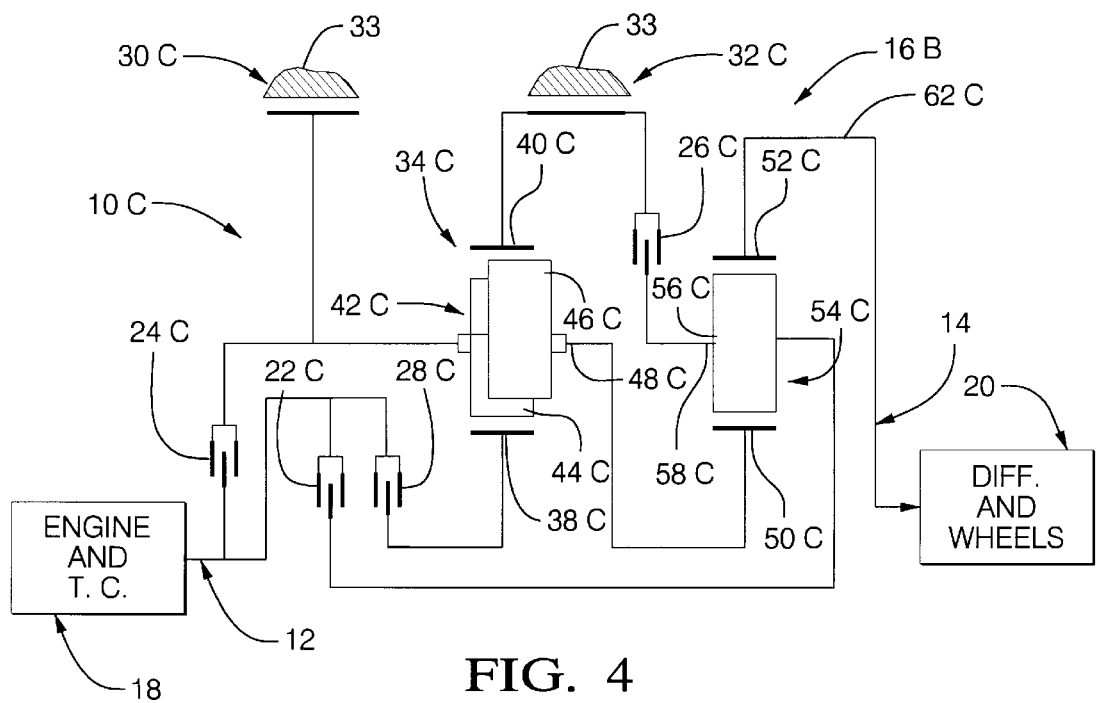
FIG. 4 is a schematic diagram of a planetary gear arrangement incorporating a further embodiment of the present invention.

The powertrain shown in FIG. 4 includes the engine and torque converter 18, the input shaft 12, a transmission 10C, the output shaft 14 and the differential 20. The transmission 10C can establish five forward drive ratios, a reverse ratio and a neutral condition between the input shaft 12 and the output shaft 14. This is accomplished with a planetary gear arrangement 16C, four selectively engageable, fluid-operated friction clutches 24C, 28C, 22C and 26C, and two selectively engageable, fluid-operated friction brakes 30C and 32C. The clutches and brakes of the transmission 10C are conventional fluid operated devices. The brakes 30C, 32C can be either the band type or the disc type.

The planetary gear arrangement 16C has a compound planetary gear set 34C and a simple planetary gear set 36C. The planetary gear set 34C has a sun gear member 38C, a ring member 40C and a planet carrier assembly member 42C. The planet carrier assembly member 42C has housing or spider 48C rotatably supporting pairs of meshing pinion gears 44C and 46C meshing with the sun gear member 38C and the ring gear member 40C, respectively. The simple planetary gear set 36C has a sun gear member 50C, a ring gear member 52C and a planet carrier assembly member 54C which is comprised of a spider 58C rotatably supporting a plurality of pinion gears 56C which mesh with both the sun gear member 50C and the ring gear member 52C.

The planet carrier assembly member 42C is continuously drive connected with the sun gear member 50C. Both of these members are also selectively drivingly connected with the input shaft 12 through the clutch 24C and selectively drivingly connected with the transmission housing 33 through the brake 30C. The ring gear member 40C and the planet carrier assembly member 54C are selectively drivingly connected by the clutch 26C. The sun gear member 38C is drivingly connectable with the input shaft 12 through the clutch 28C. The ring gear member 40C is selectively drivingly connectable with the transmission housing 33 through the brake 32C. The lanet carrier assembly member 54C is selectively drivingly connectable with he input shaft 12 through the clutch 22C. The ring gear member 52C is continuously drivingly connected with the output shaft 14.

The clutch 26C and the brake 32C are engaged for the reverse drive ratio, the neutral condition and the first forward drive ratio. To complete the reverse drive ratio, the clutch 24C is engaged. To complete the first forward drive ratio, the clutch 28C is engaged. As with the transmissions disclosed in FIGS. 1, 2 and 3 as described above, the interchange of friction devices between first and reverse is a single transition change. During the reverse drive ratio, the sun gear member 50C is the input member and the planet carrier assembly member 54C is the reaction member such that the planetary gear set 36C provides the gear ratio. In the first forward ratio, the sun gear member 38C is the input member and the ring gear member 40C and planet carrier assembly member 54C are both reaction members. The gear ratio in first is determined by the planetary gear set 34C and the planetary gear set 36C. The first forward ratio is an underdrive ratio.

To establish the second forward drive ratio, the brake 32C is disengaged and the brake 30C is simultaneously engaged. The sun gear member 38C remains the input member and the planet carrier assembly member 42C and the sun gear member 50C become the reaction members. Both planetary gear sets 36C and 34C contribute to the gear ratio. This is an underdrive ratio.

To establish the third forward ratio, the brake 30C is disengaged while the clutch 22C is simultaneously engaged. The planetary gear sets 34C, 36C are in direct drive such that a one to one ratio is attained between the input shaft 12 and the output shaft 14.

To establish the fourth forward drive ratio, the clutch 26C is disengaged and the brake 30C is simultaneously engaged. The sun gear member 50C is the reaction member in the planetary gear arrangement 16C and the planet carrier assembly member 54C is the input member. This establishes the planetary gear set 36C in a classic overdrive ratio.

To establish the fifth forward drive ratio, the brake 30C is disengaged and the brake 32C is simultaneously engaged. The ring gear member 40C becomes the reaction member and the sun gear member 38C and planet carrier assembly member 54C are driven by the input shaft 12. The sun gear member 50C is driven by the planet carrier assembly member 42C such that the planetary gear set 36C has two input members, planet carrier assembly member 54C and sun gear member 50C. The fifth forward drive ratio is an overdrive ratio dependent upon both planetary gear sets 34C and 36C.

The clutch 24C is engaged only during the reverse drive ratio. The clutch 28C is engaged during all five of the forward drive ratios. The clutch 22C is engaged during the three highest of the forward drive ratios. The clutch 26C is engaged during the reverse drive ratio, the neutral condition, and the three lowest forward drive ratios. The brake 30C is engaged during two forward drive ratios, and the brake 32C is engaged during the reverse drive ratio, the neutral condition, and the lowest and highest forward drive ratios.

| Gear Set 34C Ring/Sun Ratio | 2.15 | 2.55 |
|---|---|---|
| Gear Set 36C Ring/Sun Ratio | 2.50 | 2.00 |
| First Gear Ratio | 2.88 | 3.10 |
| Second Gear | 1.54 | 1.70 |
| Third Gear | 1.00 | 1.00 |
| Fourth Gear | 0.71 | 0.67 |
| Fifth Gear | 0.57 | 0.55 |
| Reverse Gear | 2.50 | 2.00 |
| First - Second Step Size | 1.87 | 1.82 |
| Second - Third | 1.54 | 1.70 |
| Third - Fourth | 1.40 | 1.50 |
| Fourth - Fifth | 1.25 | 1.22 |

The above chart describes the gear ratio values and step size between ratios for the gearing shown in FIG. 4 for two ring gear to sun gear ratios.

Figure 5:
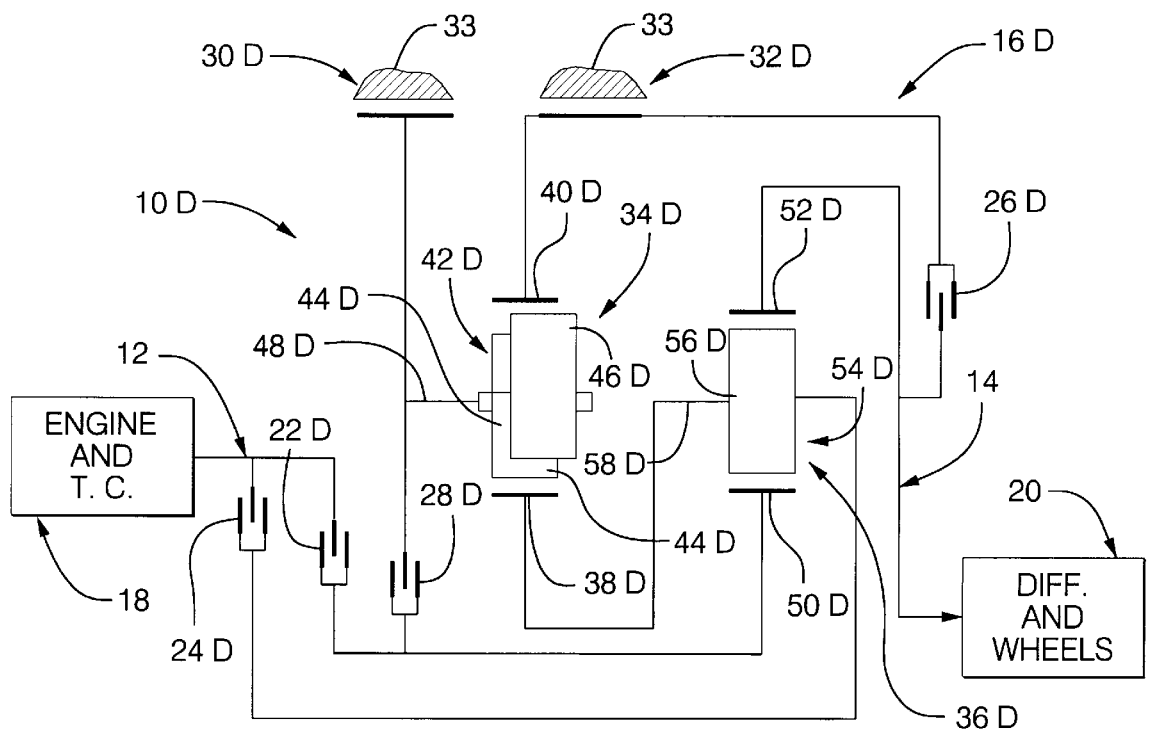
FIG. 5 is a schematic diagram of a planetary gear arrangement incorporating yet a further embodiment of the present invention.

The powertrain shown in FIG. 5 includes the engine and torque converter 18, the input shaft 12, a transmission 10D, the output shaft 14 and the differential 20. The transmission 10D has a planetary gear arrangement 16D, four clutches 22D, 24D, 26D and 28D and two brakes 30D and 32D. The planetary gear arrangement 16D has a compound planetary gear set 34D and a simple planetary gear set 36D. The planetary gear set 34D has a sun gear member 38D, a ring gear member 40D and a planet carrier assembly member 42D which includes a housing or spider 48D rotatably supporting a plurality of pinion gears 44D and 46D disposed in meshing pairs. The pinion gears 44D mesh with the sun gear member 38D and the pinion gears 46D mesh with the ring gear member 40D. The planetary gear set 36D has a sun gear member 50D, a ring gear member 52D and a planet carrier assembly member 54D which is comprised of a housing 58D rotatably supporting a plurality of pinion gears 56D which are disposed in meshing relation with the sun gear member 50D and the ring gear member 52D, respectively. The clutches 22D, 24D, 26D and 28D and the brakes 32D and 30D are conventional fluid-operated, selectively engageable friction devices.

The sun gear member 38D and the planet carrier assembly member 54D are continuously drivingly interconnected and are also selectively drivingly connected with the input shaft 12 through the clutch 24D. The planet carrier assembly member 42D is selectively drivingly connectable with the housing 33 through the brake 30D and also selectively drivingly connectable with the sun gear member 50D through the clutch 28D. The sun gear member 50D is selectively drivingly connectable with the input shaft 12 through the clutch 22D. The ring gear member 40D is selectively drivingly connectable with the output shaft 14 through the clutch 26D and the ring gear member 52D is continuously drivingly connected with the output shaft 14.

The planetary gear arrangement 16D is controllable, through the actuation of the clutches and brakes in combinations, to provide five forward drive ratios, a neutral condition, and a reverse drive ratio. The clutch 22D and the brake 30D are selectively engaged during the reverse drive ratio, the neutral condition and the first forward drive ratio. With only these two friction devices engaged, the planetary gear arrangement 16D is not conditioned to transmit torque between the input shaft 12 and the output shaft 14. The reverse drive ratio is completed with the engagement of the brake 32D. This establishes the planetary gear set 34D and therefore the planet carrier assembly member 54D as a reaction element and sun gear member 50D as an input element. The reverse gear ratio is provided by the planetary gear set 36D. The first forward ratio is completed with the engagement of the clutch 26D. This establishes the sun gear member 50D as the input member, the planet carrier assembly member 42D as the reaction member and the ring gear member 40D as the output member. The first forward gear ratio is established through both the planetary gear set 34D and the planetary gear set 36D. In both the reverse ratio and the first forward ratio, the output shaft 14 rotates slower than the input shaft 12.

The second forward drive ratio is established by simultaneously disengaging the clutch 22D and engaging the clutch 24D. The sun gear member 38D becomes the input member, the planet carrier assembly member 42D remains the reaction member and the ring gear member 40D remains the output member. The second forward gear ratio is provided by the planetary gear set 34D. An underdrive ratio is created such that the output shaft 14 rotates slower than the input shaft 12.

To establish the third forward drive ratio, the clutch 26D is disengaged while the clutch 22D is simultaneously engaged. This places the planetary gear set 36D in a direct drive with the ring gear member 52D driving the output shaft 14 at the same speed as the input shaft 12.

The fourth forward drive ratio is established with the simultaneous disengagement of the clutch 22D and engagement of the clutch 28D. The sun gear member 50D is the reaction member and the planet carrier assembly member 54D is the input member. A classic overdrive ratio between the input shaft 12 and the ring gear member 52D, which is driving the output shaft 14, is created in the planetary gear set 36D.

The fifth forward drive ratio is established with the simultaneous disengagement of the brake 30D and the engagement of the brake 32D. The reaction member is the ring gear member 40D, and the planet carrier assembly member 54D and sun gear member 38D are input members. The ring gear member 52D is the output member. Forward rotation of the sun gear member 38D causes reverse rotation of the planet carrier assembly member 42D and sun gear member 50D. This results in a forward overdrive ratio at the ring gear member 52D.

The clutch 22D is engaged during the reverse ratio, the neutral condition and two forward ratios. The clutch 24D is engaged during the four highest forward ratios. The clutch 26D is engaged during the two lowest forward ratios. The clutch 28D is engaged during the two highest forward ratios. The brake 32D is engaged during the reverse ratio and the highest forward ratio, and the brake 30D is engaged during the reverse ratio, the neural condition and the four lowest forward ratios.

The planetary gear arrangements described above all contribute five forward drive ratios, a neutral condition and a reverse drive ratio. Each planetary gear arrangement has at least one simple planetary gear set. In each of the arrangements, the ring gear member of the simple planetary is continuously connected with the output shaft, one member of one planetary gear set is continuously drivingly connected with one member of the other planetary gear set, the planetary gear sets are interconnected with a selectively engageable clutch, and each arrangement has at least two input clutches and two brakes.

| | | |
|---|---|---|
| Gear Set 34D Ring/Sun Ratio | 1.63 | 1.74 |
| Gear Set 36D Ring/Sun Ratio | 2.00 | 2.00 |
| First Gear Ratio | 2.88 | 3.22 |
| Second Gear | 1.63 | 1.74 |
| Third Gear | 1.00 | 1.00 |
| Fourth Gear | 0.67 | 0.67 |
| Fifth Gear | 0.43 | 0.46 |
| Reverse Gear | 2.00 | 2.00 |
| First - Second Step Size | 1.77 | 1.85 |
| Second - Third | 1.69 | 1.76 |
| Third - Fourth | 1.50 | 1.50 |
| Fourth - Fifth | 1.53 | 1.45 |

The above chart describes the gear ratio values and step size between ratios for the gearing shown in FIG. 5 for two ring gear to sun gear ratios. As with the example given with transmission 10A, the simple planetary gear set 36D is unchanged. The fourth forward ratio and reverse ratio are dependent only on this gear set and are therefore unchanged.

We claim:

1. A five speed planetary gear transmission comprising: an input shaft; an output shaft; a plurality of selectively engageable torque transmitting devices including a first selectively engageable clutch means for transmitting torque, second selectively engageable clutch means for transmitting torque, third selectively engageable clutch means for transmitting torque, fourth selectively engageable clutch means for transmitting torque, first selectively engageable brake means for transmitting torque and second selectively engageable brake means for transmitting torque; a first simple planetary gear set having a first sun gear member, a first ring gear member and a first planetary carrier assembly member including a plurality of pinion gear members each meshing with both of said sun gear member and ring gear member, said first ring gear member being continuously drivingly connected with said output shaft; a second planetary gear set having three members including a second sun gear member, a second ring gear member and a second planetary carrier assembly member; first means exclusive of said members of said first and second planetary gear sets for connecting said first sun gear member and one of said second sun gear member and said second planetary carrier assembly member; second means exclusive of said members of said first and second planetary gear sets for connecting said second planetary carrier assembly member with one of said output shaft and said housing; and third means exclusive of said members of said first and second planetary gear sets for connecting said second ring gear member with one of said first planetary carrier assembly member and said output shaft, said torque transmitting devices being engageable in combination to provide five forward drive ratios, a reverse drive ratio and a neutral condition in the transmission, said first clutch means connecting one of said first planetary carrier assembly member and said second planetary carrier assembly member with said input shaft, said second clutch means connecting one of said sun gear members with said input shaft.

2. The five speed planetary transmission defined in claim 1 wherein said first means comprises a continuous drive connection, said second means comprises one of said selectively engageable torque transmitting devices and said third means comprises said third clutch means.

3. The five speed planetary transmission defined in claim 1 wherein said first means comprises said fourth clutch means.

4. The five speed planetary transmission defined in claim 1 wherein said first means comprises said fourth clutch means, and said third means comprises a continuous drive connection.

5. The five speed planetary transmission defined in claim 1 wherein said first means comprises a first of said selectively engageable torque transmitting means, and said second means comprises a second of said selectively engageable torque transmitting means.

6. The five speed planetary transmission defined in claim 1 wherein a first and a second of said selectively engageable torque transmitting devices are engaged during the reverse drive ratio, a lowest of the forward drive ratios and the neutral condition; wherein a third of said selectively engageable torque transmitting devices is engaged during at least four of the forward drive ratios and wherein said first of said selectively engageable torque transmitting devices is engaged during at least one further forward drive ratio.

7. The five speed planetary transmission defined in claim 6 wherein said first of said selectively engageable torque transmitting devices is disengaged in a highest of said five forward drive ratios.

8. A five speed planetary transmission comprising: an input shaft; an output shaft; a plurality of selectively engageable torque transmitting devices including a first selectively engageable clutch means for transmitting torque, second selectively engageable clutch means for transmitting torque, third selectively engageable clutch means for transmitting torque, fourth selectively engageable clutch means for transmitting torque, first selectively engageable brake means for transmitting torque and second selectively engageable brake means for transmitting torque; a first simple planetary gear set having a first sun gear member, a first ring gear member and a first planetary carrier assembly member including a plurality of pinion gear members each meshing with both of said sun gear member and ring gear member, said first ring gear member being continuously drivingly connected with said output shaft, said first sun gear member being connectable with a stationary housing by said second brake means and said planetary carrier assembly member being connectable with said stationary housing by said first brake means; a second planetary gear set having three members including a second sun gear member, a second ring gear member and a second planetary carrier assembly member; first means exclusive of said members of said first and second planetary gear sets for connecting said first sun gear member and said second sun gear member; second means exclusive of said members of said first and second planetary gear sets for connecting said second planetary carrier assembly member with one of said output shaft and said housing; and third means exclusive of said members of said first and second planetary gear sets for connecting said second ring gear member with one of said first planetary carrier assembly member and said output shaft, said torque transmitting devices being engageable in combination to provide five forward drive ratios, a reverse drive ratio and a neutral condition in the transmission.

9. The planetary transmission defined in claim 8 wherein said first clutch means is operable to connect one of said first planetary carrier assembly member and said second planetary carrier assembly member with said input shaft, and said second clutch means is operable to connect one of said sun gear members with said input shaft.

10. A five speed planetary transmission comprising: an input shaft; an output shaft; a plurality of selectively engageable torque transmitting devices including a first selectively engageable clutch means for transmitting torque, second selectively engageable clutch means for transmitting torque, third selectively engageable clutch means for transmitting torque, fourth selectively engageable clutch means for transmitting torque, first selectively engageable brake means for transmitting torque and second selectively engageable brake means for transmitting torque; a first simple planetary gear set having a first sun gear member, a first ring gear member and a first planetary carrier assembly member including a plurality of pinion gear members each meshing with both of said sun gear member and ring gear member, said first ring gear member being continuously drivingly connected with said output shaft, said first sun gear member being connectable with a stationary housing by said second brake means and said planetary carrier assembly member being connectable with said stationary housing by said first brake means; a second planetary gear set having three members including a second sun gear member, a second ring gear member and a second planetary carrier assembly member; said third clutch means connecting said first sun gear member and said second sun gear member; said fourth clutch means connecting said second planetary carrier assembly member with said output shaft; and means for continuously connecting said second ring gear member with said first planetary carrier assembly member, said torque transmitting devices being engageable in combination to provide five forward drive ratios, a reverse drive ratio and a neutral condition in the transmission.

11. The planetary transmission defined in claim 10 wherein said first clutch means is operable to connect said second planetary carrier assembly member with said input shaft, and said second clutch means is operable to connect said second sun gear members with said input shaft.

12. The planetary transmission defined in claim 10 wherein said second planetary gear set is a simple planetary gear set.

13. The planetary transmission defined in claim 11 wherein said second planetary gear set is a simple planetary gear set.

* * * * *